May 31, 1932.  A. NYMAN  1,861,024
CLAMP FOR CONDENSERS
Filed March 15, 1926
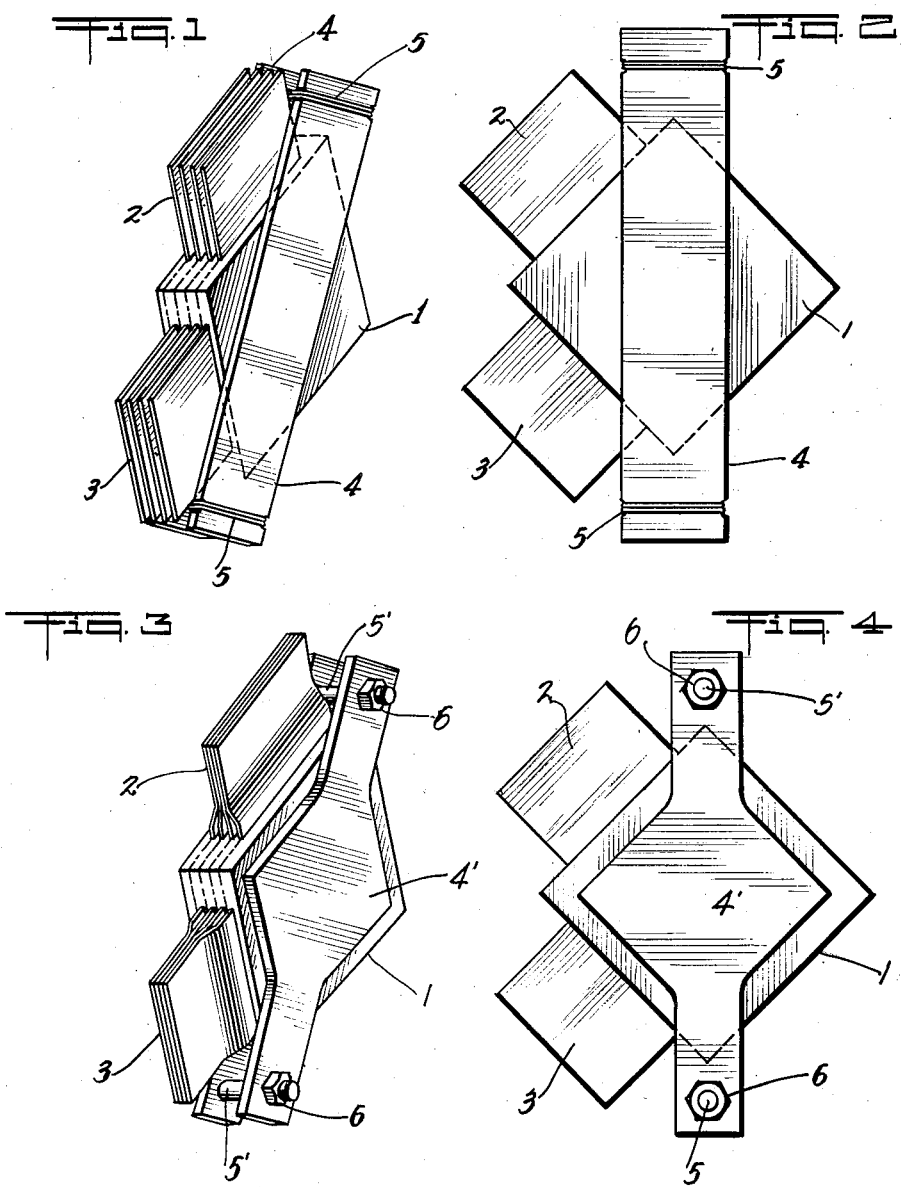
INVENTOR
*Alexander Nyman*
BY
*William F. Nickel*
ATTORNEY Patented May 31, 1932

1,861,024

UNITED STATES PATENT OFFICE

ALEXANDER NYMAN, OF NEW YORK, N. Y., ASSIGNOR TO DUBILIER CONDENSER CORPORATION, OF NEW YORK, N. Y., A CORPORATION OF DELAWARE

CLAMP FOR CONDENSERS

Application filed March 15, 1926. Serial No. 94,856.

My invention relates to improvements in electrical condensers; especially electrical condensers having the body or stack held together by a suitable clamp.

An object of the invention is to provide an electrical condenser having its conductive and dielectric elements secured by a clamp which holds them in a state of compression and yet is adapted to permit the use of heavy currents at short wave length in the condenser, without overheating of the clamp.

This and other objects I attain by the construction herein illustrated as an embodiment of one example of my invention; and I may, of course vary this construction without departing from the principle of the invention, as indicated by the broad meanings of the terms of the appended claims.

On the drawings:

Figure 1 is a perspective view and Figure 2 is a plan view of an electrical condenser with a clamp according to my invention; and Figures 3 and 4 are similar views of a modification.

The same numerals identify the same parts throughout.

Referring particularly to the drawings, numeral 1 indicates the stack or body of the condenser, which comprises a number of sheets or elements of conductive material 2, all of one polarity, and a number of sheets or elements of conductive material of opposite polarity. These elements 2 and 3 are arranged in alternation and the stack, of course, includes insulations such as sheets of mica or other dielectric to separate the sheets of one polarity from one another and from the sheets of opposite polarity. The clamp which engages the body or stack and holds the conductive elements 2 and 3 and insulation under compression, is shown as comprising a pair of plates or bars 4 which may be of steel, but are ordinarily of non-magnetic material such as phosphor-bronze, one bar or plate on each face of the stack, the ends of the bars being secured by suitable fastening means such as loops of wire 5. As will be noted from Figs. 1 and 3, a layer of insulation of considerable thickness is interposed between the bars 4 and the conductive elements of the stack.

The shape of the stack 1 is shown as square or rectangular with the ends of the elements 2 and the ends of the elements 3 projecting out of adjacent sides so that the ends of the elements 2 and the ends of the elements 3 both protrude from the ends on the same side of the clamp. Thus, when a circuit is connected to the terminal 2 and the opposite side of the circuit is joined to the terminal 3, the current enters and leaves the condenser always at the same side of the clamp, and the clamp does not form a loop around the circuit when current flows therein (see Figure 2); but occupies a neutral position as regards the possible magnetic and inductive effect of the current on said clamp, which extends diagonally and crosses the remote ends of adjacent sides of the body 1, as shown. If the relative position of the clamp were otherwise; for example, if the clamp extended across the line between the two terminals of the condenser, as it would if the elements 3 projected from the lower side of the stack with reference to Figure 1, the metallic clamp would thus form a loop around the circuit and the magnetic field due to the current, would take the path provided by this metallic loop and eddy currents would be set up in the clamp causing losses and heating of the clamp to a considerable degree. Such overheating is avoided by the relative arrangement of the conductive plates 2 and 3 in the clamp herein set forth. The relatively thick insulating layer between the metallic clamps and the conductive plates of the stack also assists in reducing eddy current losses by providing a greater separation of the respective elements.

In Figures 3 and 4 the construction is similar, except that the bars 4' are widened somewhat in the middle to engage a larger portion of the opposite faces of the stack, and bolt 5' with binding nuts 6 pass through the ends of the bars 4' to hold the two bars tightly against the opposite sides of the stack.

Having described my invention, what I believe to be new and desire to secure and protect by Letters Patent of the United States is:—

1. A condenser comprising a stack containing conductive elements of opposite polarity, the elements of one polarity having ends protruding from the stack in proximity to the projecting ends of the elements of opposite polarity and a clamp for the stack extending in the same direction as a line joining the points at which said elements project from the stack.

2. A condenser comprising a stack having a plurality of sides, elements projecting from adjacent sides of said stack, and a clamp engaging both faces of the stack and extending in such direction that it crosses the ends of said adjacent sides that are most remote from each other.

3. A condenser comprising a four sided stack, elements of opposite polarity arranged at right angles to each other and projecting from the stack at adjacent sides thereof, and a clamp for the condenser extending diagonally across the stack in the same direction as a line extending from one terminal to the other.

4. A condenser comprising a four sided stack, elements of opposite polarity arranged at right angles to each other and projecting from the stack at adjacent sides thereof, and a clamp for the condenser extending diagonally across the stack, said clamp comprising plates, and tension means for securing the ends of said plates together.

5. A condenser comprising a four sided stack, elements of opposite polarity arranged at right angles to each other and projecting from the stack at adjacent sides thereof, and a clamp for the condenser extending diagonally across the stack, said clamp comprising bars, the mid portions of which are relatively great in width, and bolts and nuts for securing said bars together.

6. An electrical condenser adapted for use with heavy currents, comprising a stack of conductive plates separated by dielectric sheets, a metallic clamp encircling the stack for exerting pressure thereon, said clamp being positioned at one side of the current path through the condenser in such manner as to prevent magnetic linkage of said path, whereby eddy current losses and heating of the clamp will be substantially reduced or eliminated.

7. An electrical condenser adapted for use with heavy currents, comprising a stack of conductive plates separated by dielectric sheets, a metallic clamp surrounding the stack and exerting pressure thereon, said clamp being spaced from and positioned at one side of the current path through the condenser in such manner as to prevent magnetic linkage of said path, whereby eddy current losses and heating of the clamp are substantially prevented.

8. An electrical condenser comprising a body of armatures of opposite polarity separated by dielectric sheets, the aggregate cross-sectional area of each group of armatures being relatively large to carry heavy currents, metallic clamping means encircling the body and positioned in such manner with respect to the current path through the body that the clamping means does not magnetically link the said current path, whereby eddy current losses and heating of the clamping means are substantially prevented.

In testimony whereof I affix my signature.

ALEXANDER NYMAN.